(12) United States Patent
Yli-juuti et al.

(10) Patent No.: US 7,266,343 B1
(45) Date of Patent: Sep. 4, 2007

(54) METHOD OF AND SYSTEM FOR PROVIDING IDENTIFICATION OF A PIECE OF INFORMATION

(75) Inventors: Erkki Yli-juuti, Helsinki (FI); Ari Aarnio, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/407,839

(22) Filed: Sep. 29, 1999

(51) Int. Cl.
*H04H 7/00* (2006.01)

(52) U.S. Cl. .................... 455/3.06; 705/26
(58) Field of Classification Search .......... 455/186.1, 455/45, 154.1, 556.1, 413, 414.1, 2.01, 3.01, 455/556; 379/101.01; 707/104; 709/219, 709/217, 203; 705/26; 725/87, 99, 115
See application file for complete search history.

(56) References Cited

U.S. PATENT DOCUMENTS

| | | | |
|---|---|---|---|
| 5,539,635 A * | 7/1996 | Larson, Jr. ............... | 700/234 |
| 5,581,658 A | 12/1996 | O'Hagan et al. | |
| 5,625,668 A * | 4/1997 | Loomis et al. ........... | 455/456.5 |
| 5,661,787 A | 8/1997 | Pocock | |
| 5,721,827 A | 2/1998 | Logan et al. | |
| 5,732,216 A | 3/1998 | Logan et al. | |
| 5,809,246 A * | 9/1998 | Goldman ................. | 709/217 |
| 5,874,686 A | 2/1999 | Ghias et al. | |
| 5,991,737 A * | 11/1999 | Chen ........................ | 705/26 |
| 6,131,042 A * | 10/2000 | Lee et al. ................. | 455/556.1 |
| 6,253,069 B1 * | 6/2001 | Mankovitz ............... | 455/186.1 |
| 6,317,784 B1 * | 11/2001 | Mackintosh et al. ..... | 709/219 |
| 6,578,047 B1 * | 6/2003 | Deguchi ................... | 707/104.1 |
| 2003/0046080 A1 * | 3/2003 | Hejna, Jr. ................. | 704/270 |

FOREIGN PATENT DOCUMENTS

| | | |
|---|---|---|
| WO | 9721291 | 6/1997 |
| WO | 9935809 | 7/1999 |
| WO | 9943111 | 8/1999 |

OTHER PUBLICATIONS

Examination Report of EP 00 660 168.6 dated Oct. 14, 2004, 6 pages.
Examination Report of EP 00 660 168.6 dated Jul. 21, 2005, 4 pages.

* cited by examiner

*Primary Examiner*—Edward F. Urban
*Assistant Examiner*—Tu X. Nguyen
(74) *Attorney, Agent, or Firm*—Banner & Witcoff, Ltd.

(57) ABSTRACT

A method of and a system for providing an identification of a piece of information to a person tuned to a broadcasting station which is broadcasting the piece of information. The person sends a first message to a centralized information identification location having a data base storing data for identifying pieces of information. The first message describes the piece of information and preferably also identifies a receiving location to which identification of the piece of information is to be sent. In response to the first message, the data base is interrogated to identify the piece of information, and a second message is sent to the identified receiving location, including identification of the piece of information. If desired, the first message can include an order for a copy of the musical piece and payment information, and the centralized music identification location can forward an order for the copy to an order shipping center.

18 Claims, 2 Drawing Sheets

METHOD OF AND SYSTEM FOR PROVIDING IDENTIFICATION OF A PIECE OF INFORMATION

BACKGROUND OF THE INVENTION

1. Field of the Invention

The present invention pertains to a method of and a system for providing information about a broadcast piece of information, for example a musical piece, to a person listening to a station which is broadcasting the piece of information, for example by playing the musical piece in a radio broadcast. More particularly, the present invention pertains to a method and a system which permit a person watching or hearing a broadcast transmission to obtain the identification of a piece of information included in the broadcast transmission, enabling the person to utilize the information by, for example, obtaining a compact disk, audio tape, video tape, phonograph record or other recording of the piece of information for his or her own use, incorporating the information into a summary such as a "Top 10 play list," etc.

2. Description of the Prior Art

People often hear or see a piece of information played in a radio or television broadcast, but do not hear, see, or otherwise know the name or other identifying information about the piece of information. For example, a listener may have turned on a radio broadcast after the name of a musical piece was given, or the listener may have had his or her attention diverted at the time the identification of the musical piece was given. If the listener finds the musical piece to be particularly appealing, then he or she may wish to obtain a copy of the musical piece, for example on a commercially available compact disk, audio tape recording, or phonograph record. To do so, of course, the listener must have the name of the musical piece and, most likely, also the name of the composer, the name of the orchestra or other musical group which performed the musical piece, and possibly the name of the company which put out the compact disk, tape recording or phonograph record.

The listener might obtain the name and other information about the musical piece by placing a telephone call to the radio or television station which provided the broadcast. This, however, requires obtaining the telephone number for the particular station. In addition, there may be times when the listener is not certain of the station to which his or her radio or television set is tuned. By way of example, the person may simply turn on the radio to the last station to which it was tuned and not note the station. This is an even greater problem for someone who hears a musical piece on the radio while driving in a car, since at the time the name of the musical piece was given the person's attention may have been diverted, for example by traffic conditions.

It has been suggested that each radio and television station provide a service in which a unique, easily remembered telephone code could be dialed, perhaps on a cellular phone, in order to contact a service at the radio station which would provide the identification of pieces of information played on that station. By way of example, a "star plus number" service could be provided in which a person could activate the "*" key on a telephone, along with the keys for numbers in a radio station's broadcasting frequency—e.g. "*1600" for an a.m. radio station broadcasting at 1600 kilohertz—in order to obtain identification of musical pieces played on the radio station. Such a service, however, requires calling a different telephone number for each broadcast station. While a listener may know the call letters of a radio station to which he or she is listening, the listener is less likely to know the frequency of the radio station, and so not know the proper number to call for such a service. In addition, such a service requires that the call be made while the piece of information is being played on the broadcasting station. This may be possible when the listener has a telephone readily accessible, but if a significant amount of time passes before the listener has access to a telephone, then such a service would not provide the identification of the desired piece of information.

SUMMARY OF THE INVENTION

The present invention is a method of and a system for providing the identification of a piece of information to a person listening to or watching a radio or television broadcast of the piece of information. In accordance with the present invention, a centralized information identification location or server has a data base storing data for identifying pieces of information. A person who wishes to learn the identification of a piece of information broadcast by a radio or television station places a telephone call to the server and sends a message describing the piece of information. At the server, the data base is interrogated to identify the piece of information. Preferably, the inquiring telephone call also identifies a receiving location to which identification of the piece of information is to be sent and, if desired, an order for a copy of the piece of information and payment information, such as identification of a credit card. In such case, once the piece of information is identified, the server sends a message identifying the piece of information to the identified receiving location. If a copy of the piece of information has been ordered, shipment and charging for that can be arranged. The server makes it unnecessary for the listener or viewer to know a specific telephone number to call for each broadcasting station. The receiving location might be a telephone or an electronic mail ("e-mail") address, or other suitable location.

The telephone call to the server might be made as the piece of information is being broadcast on the broadcasting station, or at a later time. If the call is made as the piece of information is being broadcast, the message describing the piece of information might be sending the sound of the piece of information from the radio or television broadcast directly. Alternatively, a brief excerpt from the piece of information might be recorded as the piece is being broadcast, and the telephone call placed later, with the recording providing the description of the piece of information. As another alternative, the telephone call might include identification of the radio or television station which broadcast the piece of information and the time that the broadcast occurred. Such a message could be sent by electronic mail, as well as by a telephone call. The telephone call can be made on a cellular telephone, for example using a short message service (SMS) message.

The data base at the server can include various pieces of information, for example, sounds of musical pieces, for comparison with the sound of the piece of information provided during the telephone call. Alternatively, or additionally, the data base can include play lists from radio and television stations of interest so as to identify the piece of information when the broadcasting station and time of the broadcast are known. Such a play list is arranged by time segments and lists the pieces of information which were broadcast by each radio and television station during each time segment. By looking on the play list of the broadcasting station for the time of the broadcast, the name and other information about the piece of information can be found. Alternatively, identification of a piece of information that was broadcast on a identified broadcasting station can be based on correlating the signal as contained in the telephone call to the server with signals known to have been sent from the broadcasting stations using known correlation techniques.

The listener who receives this information can utilize the information in any of several ways, for example, by obtaining a copy, by making a list of favorite musical pieces, by compiling a "top ten" list, or by applying the information to an Internet web site.

The quality of the broadcast signal received at the server through the telephone call might be degraded due to transmission errors or signal coding. Transmission errors might be caused during transmission of the broadcast signal from the broadcast station to the listener, as well as in the transmission from the listener to the data base server. Coding errors might be caused by non-ideal coding methods used in telephony, such as GSM codes. These effects can be taken into account by artificially causing similar effects in the reference signals stored in the data base that are known to have been sent by the broadcast stations, for example by coding/decoding the signal and causing some random errors to the signal. This will make the result of the comparison more reliable, at least in some cases.

BRIEF DESCRIPTION OF THE DRAWINGS

These and other aspects and advantages of the present invention are more apparent from the following detailed description and claims, particularly when considered in conjunction with the accompanying drawings which illustrate the invention as applied by way of illustration to a radio broadcast of a piece of music. In the drawings:

DETAILED DESCRIPTION

The present information will be described with reference primarily to a listener hearing a musical piece played on a radio broadcast, but the invention is likewise applicable to broadcasts of other information, not only on radio broadcasts, but also on television broadcasts, the word "information" being used in its broadest sense to encompass not only verbal information, but also musical pieces, visual information and other types of information.

Figure 1:
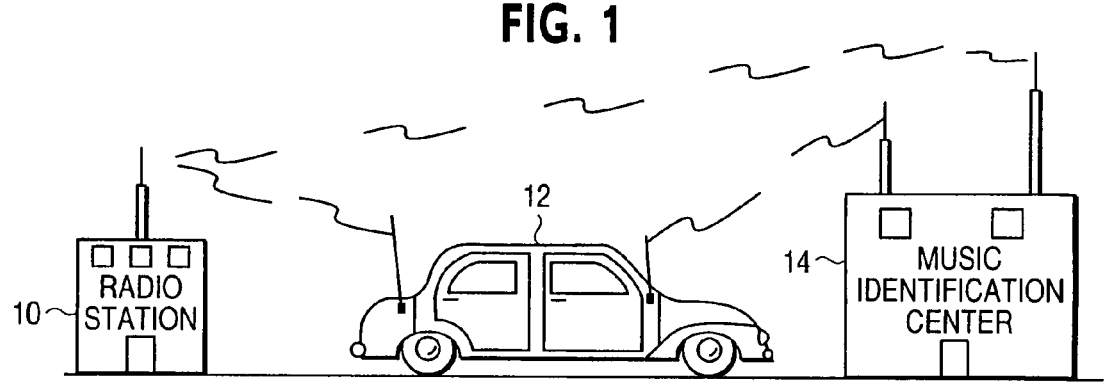
FIG. 1 is a diagram illustrating a preferred embodiment of the method and system of the present invention as applied by way of illustration to a radio broadcast of a piece of music.

FIG. 1 illustrates a first preferred embodiment of the method and system of the present invention as applied to identification of a piece of music being broadcast by radio; however, identification of any type of broadcast information might be provided in accordance with the present invention. In the illustrative system of FIG. 1, a radio station 10 is providing a radio broadcast including a musical piece, and a listener, depicted in FIG. 1 as being inside a car 10, is receiving the radio broadcast on a radio receiver, and so is hearing the musical piece and might desire to know its name and other identifying information. In the illustrative depiction of FIG. 1, the listener can activate a cellular telephone to place a call from the car 12 to a centralized music identification location or server 14, and in that telephone call can send a message describing the musical piece and identifying a receiving location, such as a telephone, to which identification of the musical piece is to be sent. That telephone might be the same cellular telephone or a different telephone.

Figure 2:
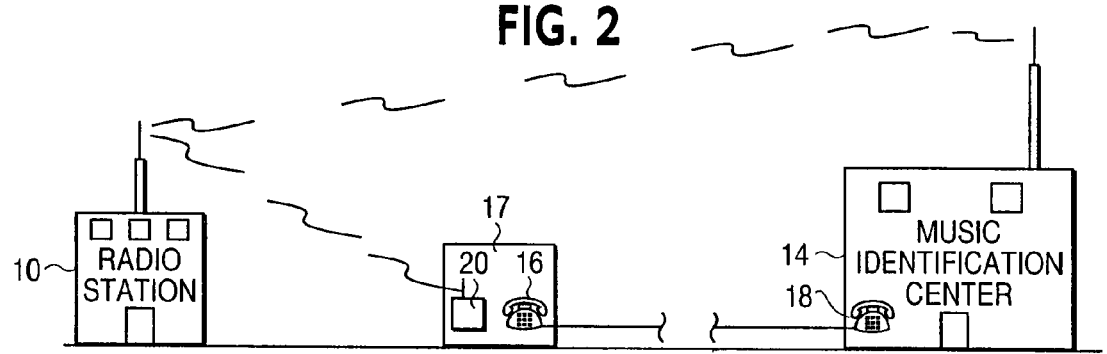
FIG. 2 is a diagram illustrating a second preferred embodiment of the method and system of the present invention as applied by way of illustration to a radio broadcast of a piece of music.

FIG. 2 depicts a second preferred embodiment of the method and system of the present invention in which the radio broadcast from radio station 10 is received by a radio receiver 20 located in a building 17. The call to the server 14 is then placed by a telephone 16 within building 17 to a telephone 18 at server 14. From a building such as building 17 the telephone call might be made on a land-line telephone, as depicted in FIG. 2, or on a cellular telephone.

Figure 3:
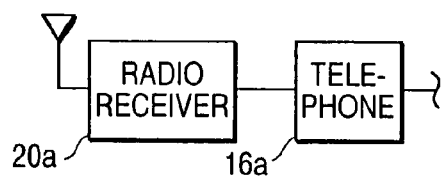
FIGS. 3, 4, 5, 6, 7, 8, and 9 depict alternative embodiments of apparatus for sending a message describing a piece of information and identifying a receiving location to which identification of the piece of information is to be sent.

FIGS. 3-9 depict alternative arrangements by which the person hearing the musical piece on the radio broadcast might send a message to the server 14. In the embodiment of FIG. 3, radio receiver 20a and telephone 16a are coupled together as one unit. Telephone 16a might be a cellular telephone or a land line telephone. If radio receiver 20a and telephone 16a are in a vehicle such as automobile 12, then telephone 16a is a cellular telephone. When the listener hears a musical piece for which he or she wants the identification, the person activates telephone 16a to place a call to server 14. That call sends a message to the server which describes the musical piece as the musical piece is being received by radio receiver 20a, for example by applying the received and demodulated radio signal directly to the telephone input in addition to, or instead of to, the radio loudspeaker. Preferably, that message also identifies a receiving location to which identification of the musical piece is to be sent. The receiving location to which the identification is to be sent might be telephone 16a or another telephone or might be an alternative location, such as an e-mail address.

Figure 4:
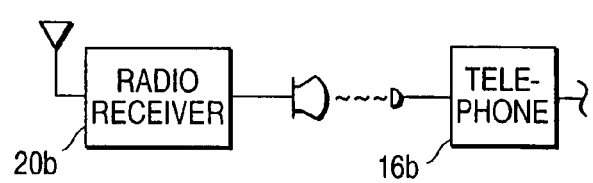

FIG. 4 depicts a modified embodiment in which radio receiver 20b provides an audio output through its loud speaker, while telephone 16b is acoustically coupled to the loud speaker, and so picks ups that audio output through its microphone and sends the audio output to server 14.

Figure 5:
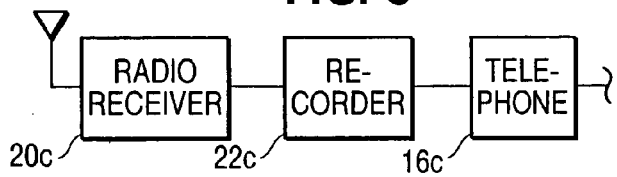

In the embodiments of FIGS. 3 and 4, the telephone call to the server is made while the musical piece is being received on the radio receiver. If access to a telephone is not available at that time, for example due to the telephone being otherwise in use, then as depicted in FIG. 5 radio receiver 20c can apply a signal encompassing the musical piece to a recording device, such as a tape recorder 22c, and at a later time the recorded musical piece, or a segment of it, can be played back by recording device 22c through telephone 16c, which is electrically coupled to the recording device, to provide the message to the server, preferably together with a time stamp indicating when the musical piece was recorded. In this regard, the term "recording device" refers to a device capable of making a recording of the piece of information and playing back that recording.

Figure 6:
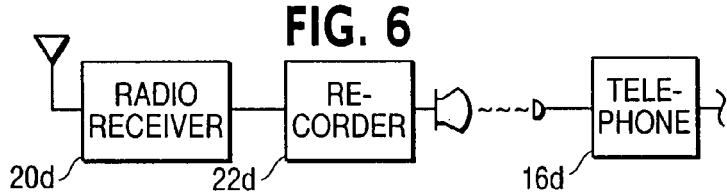

Similarly, FIG. 6 depicts an embodiment in which radio receiver 20d applies the musical piece to recording device 22d, and at a later time the recorded musical piece is played back through the load speaker of the recording device and picked up by the microphone of telephone 16d, which is acoustically coupled to the loud speaker, to send the message to the server 14, preferably together with a time stamp.

Radio receiver 20a and telephone 16a of FIG. 3 might be a unitary device having both the radio receiver and telephone built into it. Alternatively, they might be separate components wired together so that the musical piece is transmitted in the form of an electrical signal from radio receiver 20a to the telephone 16a. Likewise, radio receiver 20c, recording devices 22c, and telephone 16c of FIG. 5 might be a unitary device or separate components wired together.

Figure 8:
Figure 7:
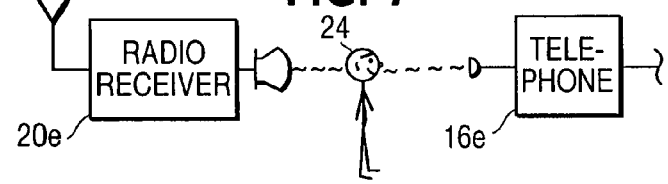

In each of the embodiments of FIGS. 3-6, the musical piece is transmitted in an electromagnetic or electrical signal by means of the telephone 16 to the server 14 which then interrogates the data base to identify the musical piece, for example by comparing the sound of the received musical piece with sounds recorded in the data base. For a vocal piece, a voice recognition system might be utilized. FIG. 7 depicts an alternative embodiment of the invention in which a listener 24 hears the musical piece as the radio broadcast is received by radio receiver 20e and, either at that time or at a subsequent time, uses telephone 16e to place a call to server 14 and transmits a message including identification of the radio station which broadcast the musical piece and the time that the broadcast occurred. As a further alternative, such a message could be sent by the listener from an e-mail terminal 16f, as depicted in FIG. 8. At the centralized music identification location, the data base is interrogated to locate the time on a play list giving the musical pieces played by the identified radio station and the times when those pieces were played, and so providing identification of the musical piece. Alternatively, if the call is made or e-mail message is sent while the musical piece is being received on radio receiver 20e, then at the server 14, a radio receiver could be tuned to the identified radio station to receive the sound of the musical piece, enabling comparison of that sound with sounds in the data base.

In a similar way, if the identity of the radio station is not known, then at centralized music identification location radio frequencies can be scanned until the signal received from one of the radio receivers 20a or 20b is found, and the radio station then identified, permitting interrogation of its play list.

Figure 9:
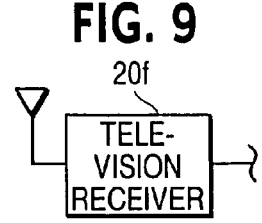

As illustrated in FIG. 9, the broadcast information might be in a television broadcast received on a television receiver 20f, rather than in a radio broadcast.

Any of the telephones 16a-16e might be a cellular telephone or a land-line telephone.

Figure 11:
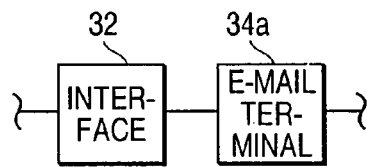
FIG. 11 is a fragmentary block diagram illustrating another preferred embodiment of apparatus in accordance with the present invention for sending to an identified receiving location a message including identification of the piece of information.
Figure 10:
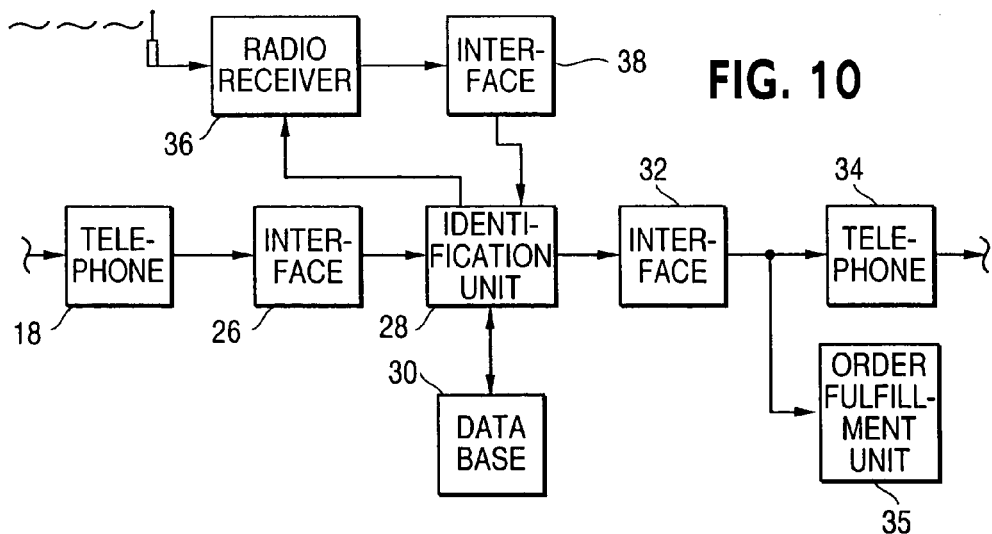
FIG. 10 is a block diagram of a preferred embodiment of apparatus in accordance with the present invention for identifying a piece of information and sending to an identified receiving location a message including the identification of the piece of information.

FIG. 10 is a block diagram depicting an arrangement which might be included in the centralized music identification location or server 14. The telephone message from the telephone 16 is received by telephone 18 and passed through an interface unit 26 to an identification unit 28. Interface unit 26, by way of example, might convert a received analog telephone signal into a digital form suitable for use by identification unit 28. The identification unit 28 interrogates data base 30 to identify the musical piece. Identification unit 28 then applies a signal through interface unit 32 to telephone 34, including identification of the musical piece and identification of the receiving location to which the identification of the musical piece is to be sent. If that receiving location is a telephone telephone 34 then places a call to the identified telephone and transmits a message including identification of the musical piece. A single telephone might be used both to receive the telephone message from telephone 16 and to send the telephone message identifying the musical piece, thus replacing telephones 18 and 34. Alternatively, the identification of the musical piece might be sent in an e-mail message from an e-mail terminal 34a, as depicted in FIG. 11.

If the telephone message received by telephone 18 includes an order for a copy of the musical piece, for example on a compact disk, audio tape, or phonograph record, and payment information, then that information is applied through interface 32 to an order fulfillment unit 35, which might be a facsimile machine or an e-mail terminal that sends a facsimile or e-mail message to a remote shipping and billing center to ship the copy of the musical piece to the listener.

Data base 30 can have stored within it digital representations of musical pieces so that identification unit 28 can compare a received musical piece with the musical pieces in the data base. Alternatively, or additionally, data base 30 can have stored within it play lists for the several radio stations so that when the telephone message received by telephone 18 and applied through interface 26 to identification unit 28 is the identification of a radio station and the time that a musical piece was played, then identification unit 28 can interrogate the play list for the identified radio station to determine the identification of the musical piece. If such telephone message identifying the radio station is received during the time the musical piece is being played by the radio station, then identification unit 28 can cause radio receiver 36 to be tuned to the identified radio station so that the musical piece as received by radio receiver 36 is applied through interface unit 38 to identification unit 28 for comparison with musical pieces in data base 30.

Identification unit 28 can be a properly programmed digital processor and might be incorporated with telephones 18 and 34, data base 30, and order fulfillment unit 35 into a computer system. If the identification message from centralized music identification location 14 is sent by e-mail, such a computer system can transmit the message.

Instead of a musical piece, the piece of information to be identified may be, for example, a spoken news broadcast or a broadcast of or commentary on a sports event. In any case the identification of the piece of information might be provided by e-mail, including a link pointing to an Internet web page having more information on the broadcast information.

Thus, in accordance with the present invention, regardless of the broadcast station which is broadcasting the piece of information, the listener can call one centralized information identification location and send a message describing the piece of information and preferably also identifying a receiving location to which identification of the piece of information is to be sent, and at the centralized information identification location a data base storing data for identifying pieces of information is interrogated to identify the piece of information, and a message is sent to the identified receiving location including identification of the piece of information. Although the present invention has been described with reference to preferred embodiments, numerous rearrangements, alterations, and substitutions can be made, and still the result would be within the scope of the invention.

What is claimed is:

1. A method comprising:
   (a) playing a musical piece in a radio broadcast by a radio station;
   (b) receiving a telephone message at a first location, wherein
      the telephone message includes a portion of the musical piece, does not identify the musical piece and designates a location other than the first location, and
      the telephone message is initiated at the location of a first radio receiver receiving the radio broadcast and after the portion of the musical piece is played in the radio broadcast;
   (c) interrogating a data base storing data for identifying musical pieces, said interrogating including
      (c1) comparing the received portion of the musical piece with musical pieces stored in the data base, and
      (c2) identifying the musical piece based on the comparison of (c1); and
   (d) sending to the designated location a message including the identification of the musical piece obtained in (c2).

2. A method as claimed in claim 1, comprising:
   (e) receiving a second telephone message at the first location, wherein the second telephone message
      identifies a radio station,
      identifies a time that the identified radio station played a second musical piece, and
      designates a location;
   (f) interrogating a play list for the identified radio station stored in the data base; and
   (g) sending to the location designated in (e) a message including an identification of the second musical piece.

3. A method as claimed in claim 1, comprising:
   (e) receiving a second telephone message at the first location, wherein the second telephone message
      identifies a radio station while that radio station is playing a second musical piece, and
      designates a location;
   (f) tuning a second radio receiver to the identified radio station;
   (g) receiving a radio broadcast from the identified radio station while the second musical piece is being played;
   (h) interrogating the data base, said interrogating including
      (h1) comparing the radio broadcast received by the second radio receiver with musical pieces stored in the data base, and
      (h2) identifying the second musical piece based on the comparison of (h1); and
   (i) sending to the location designated in (e) a message including the identification of the second musical piece obtained in (h2).

4. A method as claimed in claim 1, wherein (d) comprises sending the message to a designated telephone.

5. A method as claimed in claim 1, wherein (d) comprises sending the message to a designated electronic mail address.

6. A method as claimed in claim 1, wherein (b) includes receiving a telephone message ordering a copy of the musical piece; and said method further comprises:
   (e) sending an order for the musical piece to an order shipping center.

7. A system
   a data base storing data for identifying musical pieces played by a plurality of radio stations;
   a music identification unit configured to locate data in said data base identifying a musical piece in response to receipt via a first telephone of a message initiated at a location of a first radio receiver playing the musical piece in a radio broadcast by a radio station, the received message including a portion of the musical piece and not identifying the musical piece, the received message being initiated after the portion of the musical piece has been played in the radio broadcast, the received message further designating a location different than the location of the first telephone; and
   means for transmitting to the designated location a message identifying the musical piece.

8. A system as claimed in claim 7, wherein said music identification unit is configured to compare the portion of the musical piece with data stored in said data base.

9. A system as claimed in claim 7, wherein said music identification unit is further configured to compare a time an identified radio station played a second musical piece with a play list for that identified radio station to identify the second musical piece.

10. A system as claimed in claim 7, wherein said music identification unit is further configured, in response to receipt of another message via the first telephone identifying a radio station playing a second musical piece, to tune a second radio receiver to that identified radio station to receive a portion of the second musical piece and to compare the portion received on the second radio receiver with musical pieces stored in the data base.

11. A system as claimed in claim 7, wherein said transmitting means comprises a second telephone.

12. A system as claimed in claim 7, wherein said transmitting means comprises means for transmitting the message by electronic mail.

13. A system as claimed in claim 7, further comprising means for sending an order for a copy of the musical piece to an order shipping center.

14. A method comprising:
   (a) receiving a broadcast piece of information with a first receiver, the first receiver storing at least a part of the broadcast piece of information;
   (b) sending a first message from a location of the first receiver to a centralized information identification location having a data base storing data for identifying pieces of information, wherein the first message includes a portion of the broadcast piece of information received and stored with the first receiver, wherein the first message does not identify the broadcast piece of information, and wherein the first message further identifies a location other than the centralized information identification location; and
   (c) receiving a second message, wherein
      the second message identifies the broadcast piece of information, and
      the identification of the broadcast piece of information is based upon a comparison of the portion of the broadcast piece of information sent in the message of (b) with pieces of information stored in the data base at the centralized information identification location.

15. A system comprising:
   a receiver that receives a broadcast piece of information, that stores the broadcast piece of information and that provides a signal reproducing the broadcast piece of information;
   first message transmitting means for transmitting a message including a portion of the stored and received broadcast piece of information but not identifying the broadcast piece of information; and a centralized information identification location, including:
- means for receiving a message from the first message transmitting means;
- a data base storing data for identifying pieces of information broadcast by a plurality of broadcasting stations; and
- an information identification unit configured, in response to a received message, to locate data in said data base identifying the broadcast piece of information and to transmit a message including said identification to a designated location, wherein
  - the received message includes a portion of the broadcast piece of information and is initiated after the receiver has received the portion of the broadcast piece of information, and
  - the received message designates the designated location.

16. A system comprising:
a receiver that receives a broadcast piece of information and provides a signal reproducing the broadcast piece of information;
first message transmitting means for transmitting a first message describing the broadcast piece if information and including a portion of the broadcast piece of information received with the receiver; and
a centralized information identification location, including means for receiving the first message, a data base storing data for identifying pieces of information broadcast by a plurality of broadcasting stations, and an information identification unit configured, in response to receipt of the first message, to locate data in said data base data identifying the broadcast piece of information and to transmit a message including an identification based on said located data to a designated location, wherein
the first message does not identify the broadcast piece of information, and
the first message designates the designated location.

17. The system of claim 16 wherein:
the receiver stores the broadcast piece of information and the first message includes at least a portion of the broadcast piece of information stored with the receiver.

18. A method comprising:
(a) receiving a telephone message that includes a portion of a musical piece and that is initiated at a location of a radio receiver with which a person is listening to a radio station playing the musical piece, wherein said telephone message is initiated after the portion of the musical piece is played by the radio station, and wherein the telephone message does not identify the musical piece;
(b) in response to (a), interrogating a data base storing data for identifying musical pieces, said database and said radio receiver being at different locations, said interrogating including
   (b1) comparing the received portion of the musical piece with musical pieces stored in the data base, and
   (b2) identifying the musical piece based on the comparison of (b1); and
(c) sending a message including the identification of the musical piece obtained in (b2).

* * * * *

UNITED STATES PATENT AND TRADEMARK OFFICE
CERTIFICATE OF CORRECTION

| | | |
|---|---|---|
| PATENT NO. | : 7,266,343 B1 | Page 1 of 1 |
| APPLICATION NO. | : 09/407839 | |
| DATED | : September 4, 2007 | |
| INVENTOR(S) | : Erkki Yli-Juuti et al. | |

It is certified that error appears in the above-identified patent and that said Letters Patent is hereby corrected as shown below:

In Column 7, Claim 7, Line 65:
    Please replace "A system" with --A system comprising:--

In Column 9, Claim 16, Line 26:
    Please replace "if" with --of--

Signed and Sealed this

First Day of July, 2008

JON W. DUDAS
*Director of the United States Patent and Trademark Office*